No. 771,314. PATENTED OCT. 4, 1904.
A. D. LUNT.
PHASE TRANSFORMATION.
APPLICATION FILED JULY 31, 1900.
NO MODEL.

Witnesses:
Lewis P. Abell.
Benjamin B. Hull.

Inventor:
Alexander D. Lunt,
by Albert G. Davis
Atty.

No. 771,314.

Patented October 4, 1904.

UNITED STATES PATENT OFFICE.

ALEXANDER D. LUNT, OF SCHENECTADY, NEW YORK, ASSIGNOR TO THE GENERAL ELECTRIC COMPANY, A CORPORATION OF NEW YORK.

PHASE TRANSFORMATION.

SPECIFICATION forming part of Letters Patent No. 771,314, dated October 4, 1904.

Application filed July 31, 1900. Serial No. 25,418. (No model.)

*To all whom it may concern:*

Be it known that I, ALEXANDER D. LUNT, a citizen of the United States, residing at Schenectady, county of Schenectady, State of New York, have invented certain new and useful Improvements in Phase Transformation, of which the following is a specification.

My present invention relates to a method of transforming three-phase current into twelve-phase current, or the reverse, and is of particular value for use in connection with rotary converters in which the armature heating is less the greater number of phases there are on the alternating-current side of the machine.

In practice I make use of three transformers, each of which is provided with one winding connected to the three-phase system and three other windings connected to the twelve-phase system. In all there are nine windings connected to the twelve-phase system, and these windings are so interrelated that their electromotive forces may be represented by a double delta superposed upon a double Y.

A better understanding of the invention will be had by reference to the following description, taken in connection with the accompanying drawings, while the points of novelty of the invention will be set forth in the claims appended hereto.

Figure 1:
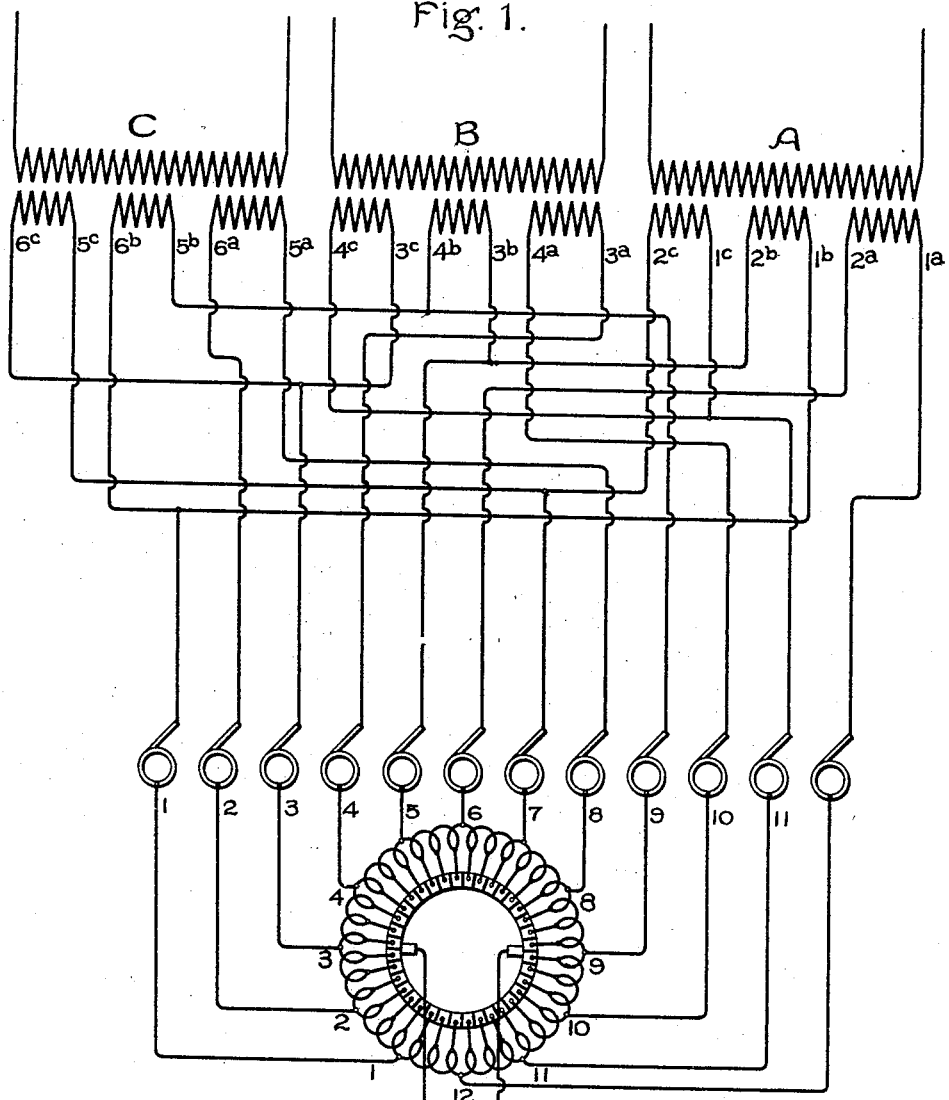
Figure 2:
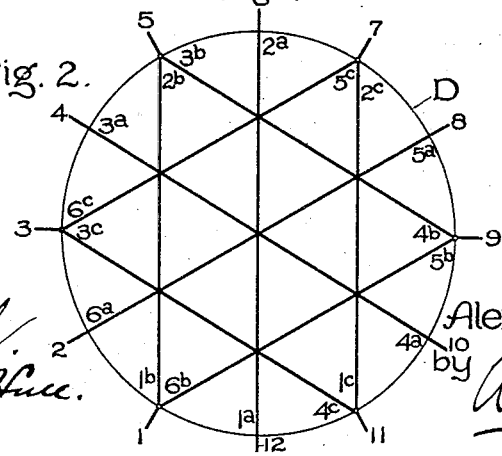

Figure 1 is a representation of my invention, and Fig. 2 a diagram of electromotive forces.

The phase transformation is performed, preferably, by a set of transformers having primary windings differing in number from the secondary windings. In Fig. 1 three transformers are shown, having primary windings A B C, connected, respectively, to three-phase mains, each primary being provided with three secondaries, two of which are identical in current-carrying capacity and number of turns, while the third has a slightly larger number of turns. Of course if twelve-phase current is to be converted into three-phase the windings will be reversed in function, those connected to the three-phase mains being their secondaries and the others primaries.

In the present embodiment of the invention all of the secondaries are connected to a rotary converter in such manner as to supply twelve-phase currents thereto. Fig. 1 illustrates this mode of connection in diagram, while Fig. 2 represents the electromotive forces acting in the system and by an arrangement of corresponding lettering is of assistance in explaining the connections in Fig. 1.

For convenience the armature-winding of the converter is represented in Fig. 2 by the circumscribing-circle D, while the points of connection of the winding are indicated by the radial lines which emanate therefrom at regular intervals, as shown, and which are numbered to correspond with the similarly-numbered taps connected to the conventional representation of the armature-winding in Fig. 1. The phases of the different electromotive forces acting upon this winding are indicated by the combination of radii and triangles within the circumference of the circle in Fig. 2.

In making up the connections between the transformers and the converter-armature the first step is to connect in delta three of the secondaries of the several transformers, this connection being made in the ordinary manner. In the drawings this delta connection starts at $1^b$, through the transformer-winding to $2^b$, then through a transformer-winding on the next phase from $3^b$ to $4^b$, then through a transformer-winding of the remaining phase from $5^b$ to $6^b$, and then back to $1^b$. This connects the electromotive forces of the windings in delta, and from points in the connections joining the transformer-windings leads extend to points on the converter-armature separated from each other by one-third of the polar pitch. Referring to the diagram representing the converter-armature, it will be seen that the connections from the secondary terminals $1^b 2^b$ lead to the taps 1 to 5, which in Fig. 2 connect to points joined by the chord designated, correspondingly, as $1^b 2^b$. In like manner the secondary $3^b 4^b$ is connected to the taps 5 to 9 spanning the corresponding chord $3^b 4^b$, while the remaining secondary of the delta is connected across the chord $5^b$ $6^b$, thus completing one delta arrangement of electromotive forces acting upon the converter-armature.

The next step is to connect up another delta, but in this case with two of the sides reversed in order to obtain a six-pointed-star arrangement represented by the two superposed and relatively reversed deltas indicated in Fig. 2. To enable the connections to be readily traced, it may be stated that parallel sides of the two deltas should have the same polarity at their corresponding ends. Thus, for example, the side $1^b$ $2^b$ of one delta and the parallel side $1^c$ $2^c$ of the other delta should have their similarly-extending ends of the same polarity.

The Figs. 1 2, as applied to the secondaries in transformer A, indicate the opposite polarities, while the exponents $a$ $b$ $c$ distinguish between the respective secondaries. A similar lettering is used in connection with the other two transformers. In making all connections between the transformer-secondaries in Fig. 1 a convenient guide may therefore be secured by similarly lettering the diagram of electromotive forces in Fig. 2. Thus the secondary connected to the taps 1 to 5 across the chord $1^b$ $2^b$ has its terminal $2^b$ at the left-hand end of the winding, as indicated. The similar secondary $1^c$ $2^c$ should therefore have its corresponding terminal $2^c$ of the same polarity indicated by the application of the reference-letters $2^c$ to the left-hand terminal. In a similar manner all the parallel chords are designated by corresponding reference - letters, whereby the proper sequence of connections may be readily made by consulting the diagram thus lettered. To connect up the second delta, the connections through the various transformers will therefore start at $1^c$, through the winding to $2^c$, then through the winding $5^c$ $6^c$, and then through the remaining winding $3^c$ $4^c$, back to the terminal $1^c$, thus completing a reversed delta. Three connections lead therefrom and are joined to corresponding points of the converter-armature, as indicated by the taps 3 7 11. Thus, to illustrate, the tap 7 (shown in Fig. 2 as leading to the intersecting ends $2^c$ and $5^c$ of two chords) is connected to their correspondingly-lettered transformer-terminals in Fig. 1. When it is understood that the apexes of one delta lie midway between the connections of the apexes of the other delta no difficulty will be found in making the connections to the proper points in the converted armature.

To complete the twelve phase connections to the rotary converter, the remaining secondary windings are connected, so that each secondary spans a diameter and is symmetrically connected with relation to the other secondaries, whereby the points of connection of one secondary are displaced by an angle of sixty degrees from each of the other secondaries. The points of connection are, however, chosen so as to lie midway between those of the double deltas, thereby constituting therewith a twelve-phase relation of electromotive forces acting upon the armature. In making the connections it is only necessary to remember that the double-Y connections, represented in the drawings by diameters, magnetize in the same direction as the chords parallel thereto—that is to say, the adjacent ends of each diameter—and its two parallel chords should be of the same polarity. Thus the adjacent ends $2^b$ and $2^c$ of two parallel chords are connected, respectively, to windings whose left-hand terminals are similarly designated. The coil across the diameter $1^a$ $2^a$ must magnetize in the same direction as the parallel chords and is therefore connected with its left-hand end $2^a$ to the tap which lies between the connections of the ends of the chords parallel to this diameter. The remaining connections will readily be understood without further explanation.

It will be evident that the currents flowing in the windings of the phase-changing transformers are normally in phase with the electromotive forces generated in the respective windings. The windings therefore are not burdened with wattless currents and may thus be made smaller than would be necessary in a system of phase transformation in which a flow of wattless current is inherent.

Although for purposes of explanation I have assumed that three-phase current is converted by the apparatus shown into twelve-phase current and supplied to a rotary converter, it will of course be obvious that the reverse operation is quite within my invention. In the latter case direct current would be fed into the rotary converter, by which it would be transformed into twelve-phase current and then by the arrangement of transformers shown into three-phase current. The exact scope of my invention is, however, to be determined not by means of the above detailed description, but by reference to the following claims.

What I claim as new, and desire to secure by Letters Patent of the United States, is—

1. The method of producing twelve-phase current, which consists in combining like phase electromotive forces derived from one phase of a three-phase system, with like phase electromotive forces derived from each of the other phases of said system, causing currents to flow in phase with said electromotive forces, and deriving twelve - phase current therefrom.

2. The method of producing twelve-phase currents which consists in setting up a plurality of three-phase electromotive forces, combining said electromotive forces so as to form a double delta and a double Y, and then deriving twelve-phase currents from the combination of electromotive forces.

3. The method of producing twelve-phase electromotive forces, which consists in combining three like phase electromotive forces derived from one phase of a three-phase system, with electromotive forces derived from the other phases of said system, and deriving thereby twelve-phase electromotive forces.

4. The method which consists in interlinking a plurality of electromotive forces in a double-delta relation to each other, and associating other electromotive forces in relation represented by a double Y.

5. The method which consists in interlinking a plurality of electromotive forces in a double-delta relation, associating other electromotive forces in a relation represented by a double Y, and through the medium of the resultant electromotive forces, transferring energy between a direct-current system and an alternating-current system.

In witness whereof I have hereunto set my hand this 30th day of July, 1900.

ALEXANDER D. LUNT.

Witnesses:
BENJAMIN B. HULL,
JAMES J. HIGGINS.